United States Patent
Chen

(10) Patent No.: US 8,311,825 B2
(45) Date of Patent: Nov. 13, 2012

(54) AUTOMATIC SPEECH RECOGNITION METHOD AND APPARATUS

(75) Inventor: Langzhou Chen, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1016 days.

(21) Appl. No.: 12/244,997

(22) Filed: Oct. 3, 2008

(65) Prior Publication Data

US 2009/0099841 A1   Apr. 16, 2009

(30) Foreign Application Priority Data

Oct. 4, 2007 (GB) .................................. 0719453.3

(51) Int. Cl.
    G10L 15/12 (2006.01)
(52) U.S. Cl. ............ 704/240; 704/9; 704/257; 704/243; 704/256.2; 704/255
(58) Field of Classification Search .............. 704/9, 240, 704/255, 254, 246, 251, 243, 256, 256.2, 704/257
    See application file for complete search history.

(56) References Cited

U.S. PATENT DOCUMENTS

| | | | |
|---|---|---|---|
| 5,241,619 A * | 8/1993 | Schwartz et al. | 704/200 |
| 5,606,644 A * | 2/1997 | Chou et al. | 704/243 |
| 6,374,217 B1 * | 4/2002 | Bellegarda | 704/240 |
| 6,856,956 B2 * | 2/2005 | Thrasher et al. | 704/251 |
| 6,961,701 B2 * | 11/2005 | Ogawa et al. | 704/236 |
| 7,219,055 B2 * | 5/2007 | Lucke | 704/234 |
| 7,555,431 B2 * | 6/2009 | Bennett | 704/255 |
| 7,574,358 B2 * | 8/2009 | Deligne et al. | 704/243 |
| 7,634,406 B2 * | 12/2009 | Li et al. | 704/244 |
| 7,657,424 B2 * | 2/2010 | Bennett | 704/9 |
| 7,979,277 B2 * | 7/2011 | Larri et al. | 704/238 |
| 8,069,045 B2 * | 11/2011 | Emam et al. | 704/256 |
| 2002/0052742 A1 * | 5/2002 | Thrasher et al. | 704/251 |
| 2003/0046073 A1 | 3/2003 | Mori et al. | |
| 2004/0148170 A1 * | 7/2004 | Acero et al. | 704/257 |
| 2006/0129397 A1 * | 6/2006 | Li et al. | 704/245 |

(Continued)

FOREIGN PATENT DOCUMENTS

| | | |
|---|---|---|
| WO | WO 96/27872 | 9/1996 |
| WO | WO 01/26092 A2 | 4/2001 |
| WO | WO 01/48737 A2 | 7/2001 |

OTHER PUBLICATIONS

Examination Report under Section 18(3) issued Sep. 18, 2009 in Application No. GB0719453.3 (w/English translation).

(Continued)

*Primary Examiner* — Vijay B Chawan
(74) *Attorney, Agent, or Firm* — Oblon, Spivak, McClelland, Maier & Neustadt, L.L.P.

(57) ABSTRACT

A system for calculating the look ahead probabilities at the nodes in a language model look ahead tree, wherein the words of the vocabulary of the language are located at the leaves of the tree,
    said apparatus comprising:
    means to assign a language model probability to each of the words of the vocabulary using a first low order language model;
    means to calculate the language look ahead probabilities for all nodes in said tree using said first language model;
    means to determine if the language model probability of one or more words of said vocabulary can be calculated using a higher order language model and updating said words with the higher order language model; and
    means to update the look ahead probability at only the nodes which are affected by the words where the language model has been updated.

25 Claims, 6 Drawing Sheets

U.S. PATENT DOCUMENTS

| | | | |
|---|---|---|---|
| 2007/0106509 A1* | 5/2007 | Acero et al. | 704/240 |
| 2007/0164782 A1* | 7/2007 | Church et al. | 326/41 |
| 2007/0179784 A1* | 8/2007 | Thambiratnam et al. | 704/255 |
| 2008/0052075 A1* | 2/2008 | He et al. | 704/256 |
| 2008/0052078 A1* | 2/2008 | Bennett | 704/257 |
| 2008/0312921 A1* | 12/2008 | Axelrod et al. | 704/240 |
| 2009/0326945 A1* | 12/2009 | Tian | 704/254 |

OTHER PUBLICATIONS

F. Javier Dieguez-Tirado, et al., "Efficient Precalculation of LM Contexts for Large Vocabulary Continuous Speech Recognition", E.T.S.I. Telecommunication, pp. 689-692, 2002.

* cited by examiner (a) (b)

US 8,311,825 B2

AUTOMATIC SPEECH RECOGNITION METHOD AND APPARATUS

BACKGROUND OF THE INVENTION

The present invention is concerned with the field of automatic speech recognition (ASR). More specifically, the present invention is concerned with methods and apparatus for calculating language model look ahead probabilities.

A language model LM, which is independent of acoustic observations, is used in ASR to incorporate restrictions on how words in a language should be concatenated together to form sentences. Generally language models are used which are based on n-grams where n−1 history words are considered. As the language model requires complete words for it to be applied, language model look ahead LMLA probabilities were introduced which allows the language model to start to be applied before a word is completed.

Language model look-ahead (LMLA) can accelerate the n-gram decoding process. The main idea of LMLA is using LMLA probability as linguistic score when the current word id is unknown. This technology leads to more efficient pruning in the decoding process. However, the calculation cost of generating the LMLA probabilities is high in traditional method. When a high order LMLA, for example trigram LMLA is adopted, the number of different trigram contexts that occur in the search space increase dramatically compared to the number of bigram contexts. As a result, the calculation cost of trigram LMLA is much higher than the bigram LMLA and it is even can not be compensated by the search space reduction from the use of this technology. In order to overcome this problem, some good methods have been presented, including node based LMLA probability cache, pre-calculating the LM probabilities and perfect hashing. Most these methods focus on how to cache and look up the LMLA probabilities efficiently. However, generating the LMLA probability itself is a time consuming process.

SUMMARY OF THE INVENTION

The present invention addresses this issue and in a first aspect provides a system for calculating the look ahead probabilities at the nodes in a language model look ahead tree, wherein the words of the vocabulary of the language are located at the leaves of the tree, said apparatus comprising:
means to assign a language model probability to each of the words of the vocabulary using a first low order language model;
means to calculate the language look ahead probabilities for all nodes in said tree using said first language model;
means to determine if the language model probability of one or more words of said vocabulary can be calculated using a higher order language model and updating said words with the higher order language model; and
means to update the look ahead probability at only the nodes which are affected by the words where the language model has been updated.

The present invention generates the higher order LMLA probabilities from the lower order LMLA trees. The method based on the sparseness of the in-gram LM. In the backoff based LM, given the word context information, only a small part of n-gram probabilities are estimated explicitly, while the rest of them are calculated by the backoff estimate. Based on this fact, we start the calculation of the n-gram LMLA tree from the (n−1)-gram LMLA tree. If the node in n-gram LMLA tree is not related to the explicitly estimated n-gram value, then the LMLA probability of this node can be got from the (n−1)-gram LMLA tree directly.

Using this method, the process of generating the bigram LMLA tree can be accelerated by a factor of 3 and the process of generating the trigram LMLA tree can be accelerated by a factor of 12.

The traditional method treats the calculation of the LM probabilities and the LMLA probabilities as two independent processes. However, the calculation of LMLA probabilities is strongly related to the calculation of the LM probabilities. Making use of this relationship, the calculation of LMLA probabilities can be greatly accelerated. The present invention reduces the number of calculations of language model (LM) look-ahead probabilities in decoder running with a statistical language model and language model look ahead. Further the present invention reduces the memory cost of LM look-ahead.

When considering n-gram language models it is necessary to collate statistical information concerning a word and the occurrences of preceding words. However, this data is not always available. To address this issue the concept of a back-off parameter was derived which allows one to estimate, for example, a bigram probability from a unigram model for a particular word when there is no bigram data for that word available. The system will preferably use a back-off parameter with the lower order language model. The system may be configured to store or calculate this back-off parameter.

To determine if the language model probability of one or more words of said vocabulary can be calculated using a higher order language model, the system is preferably configured to determine if a word has occurred in combination with a previously recognised word.

The higher order model is preferably a bigram, trigram, fourgram or higher order n-gram model.

In a preferred embodiment, the system further comprises a memory having a multi-cache structure, wherein the number of caches of the memory equals the order of the n-gram model used in the system.

In second aspect, the present invention provides au automatic speech recognition system comprising:
means to receive speech;
means to extract acoustic signals from said speech and determine a first probability of the words contained in said speech;
means to provide a language model to determine a second probability of the words contained in said speech comprising a system for calculating the look ahead probabilities at the nodes in a language model look ahead tree as previously described and
means to combine the first and second probabilities and output the words recognised from the received speech.

The means to receive speech may be a microphone, recording of speech etc.

In a third aspect, the present invention provides a method of calculating language model look ahead probabilities at the nodes in a language model look ahead tree, wherein the words of the vocabulary of the language are located at the leaves of the tree, said method comprising:
assigning a language model probability to each of the words of the vocabulary using a first low order language model;
calculating the language look ahead probabilities for all nodes in said tree using said first language model;
determining if the language model probability of one or more words of said vocabulary can be calculated using a higher order language model and updating said words with the higher order language model probabilities; and updating the look ahead probability at only the nodes which are affected by the words where the language model has been updated.

Preferably, determining the lower order language model probabilities uses a back-off parameter.

The method is a dynamic method and new acoustic signals will need to be continually decoded to form words. If a new LMLA tree is required it can be constructed by: resetting the language model look ahead probabilities to the lower order language model;

determining if the language model probability of one or more words of said vocabulary can be calculated using a higher order language model and updating said words with the higher order language model probabilities; and updating the took ahead probability at only the nodes which are affected by the words where the language model has been updated.

The LMLA tree will not have to be updated for every acoustic vector received. For example, is a new vector is determined which does not result in a new LM context, or the LMLA tree for this context can be found in cache, there is no need to update the LMLA.

In a fourth aspect, the present invention provides an automatic speech recognition method comprising:

receiving speech;

extracting acoustic signals from said speech and determining a probability of the words contained in said speech based on said acoustic signals; and providing a language model comprising calculating the look ahead probabilities at the nodes in a language model look ahead tree as previously described and outputting the words recognised from the received speech.

Although the description will concentrate on speech recognition, it will be appreciated by those skilled in the art that the present invention may also be applied to speech-to-speech translation, OCR, handwriting recognition, or other dynamic programming searching using statistical language model information. The system may even by applied to DNA genome sequencing.

The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

The present invention will now be described in more detail with reference to the following nor-limiting preferred embodiments in which:

DETAILED DESCRIPTION OF THE INVENTION

During automatic speech recognition (ASR) the speech which is to be recognised is first digitized and next the features which represent the spectral domain content of the speech are computer. To match these features to the words within the vocabulary of the recognition system two types of probability distributions are used. One of these is the acoustic-phonetic or acoustic model which represents the probability of matching the acoustic vectors derived from the above features to the words which have been spoken and the other is the language model. The language model is completely independent of the acoustic observations and is used to incorporate restrictions on how to concatenate words of the vocabulary to form whole sentences.

The present invention is concerned with the language model. However, to put the present invention into context, a description will be first given of ASR in general.

As used herein, the term "word" represents the basic unit of the statistical language model. Related to the "word", the concept of word sequences, sub-word sequences and lexicon are as follows.

a. Word sequences
  i. General problem of decoding is to find the sequence of "words" contained in an input signal. The "words" is a sequence of the statistical units in a language model (LM).
  ii. Sequence of words can be modelled by a statistical LM known as an n-gram model, which uses most recent n−1 history words to calculate the probability of current word. Supposing there are a sequence of words $w_1 w_2 \ldots w_K$, based on n-gram model, the probability of $w_1 w_2 \ldots w_K$ can be calculated as:

$$P(w_1 w_2 \ldots w_k) = \prod_{i=1}^{K} P(w_l | w_1 \ldots w_{l-1}) \approx \prod_{i=1}^{K} P(w_i | w_{i-n+1} \ldots w_{i-1}) \quad (1)$$

Figure 1:
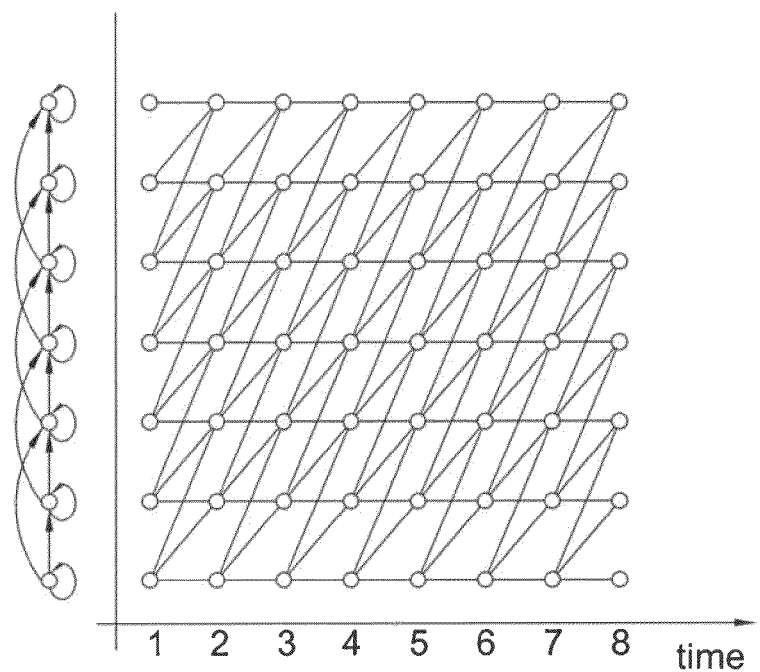
FIG. 1 is a schematic of the search space of ASR.

In Eqn 1, if i−n+1<1, the word history start from $w_1$ b. Sub-word sequences
  For the decoding tasks considered within this patent, each word can be represented as a sequence of 1 or more sub-word units e.g. phones in speech, letters in OCR etc e.g. "sat /s A t/, sang /s A n g/"

c. Lexicon
  The lexicon is a general representation of the word set in the search space, which is often represented by means of a lexical network, every path in the lexical network represents the sub-word sequence of a word. The widely used lexical prefix tree is a special case of lexical network The main task of decoding is selecting the word sequence with the highest likelihood from the huge search space. For the Hidden Markov Model (HMM) based Large Vocabulary continuous speech recognition (LVCSR) the decoding problem is, given the acoustic feature sequence, to combine the lexicon, acoustic model and language model information and to find the best path (with the maximum posterior likelihood), i.e. the best HMM state sequence from the trellis search space where each node associates an HMM state with a given time. FIG. 1 shows an example of the search space of ASR (Ney and Ortmanns 2000).

Figure 2:
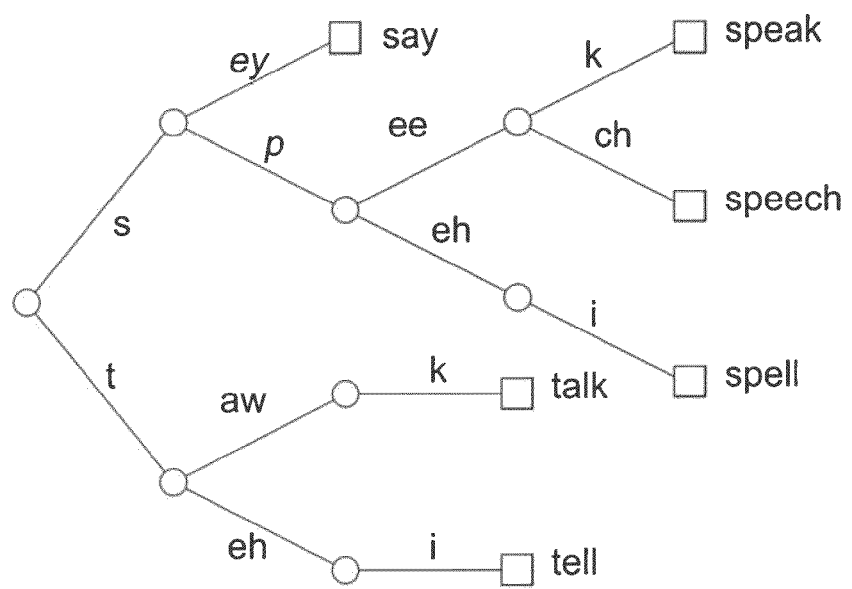
FIG. 2 is a schematic of a pronunciation network.

FIG. 2 shows a pronunciation network. For the efficiency reason, the pronunciation lexicon of ASR is usually organized as a pronunciation network in which each arc represents a phoneme model. The phoneme model can be context dependent or independent. The widely used pronunciation prefix tree is the special case of pronunciation network.

Figure 3:
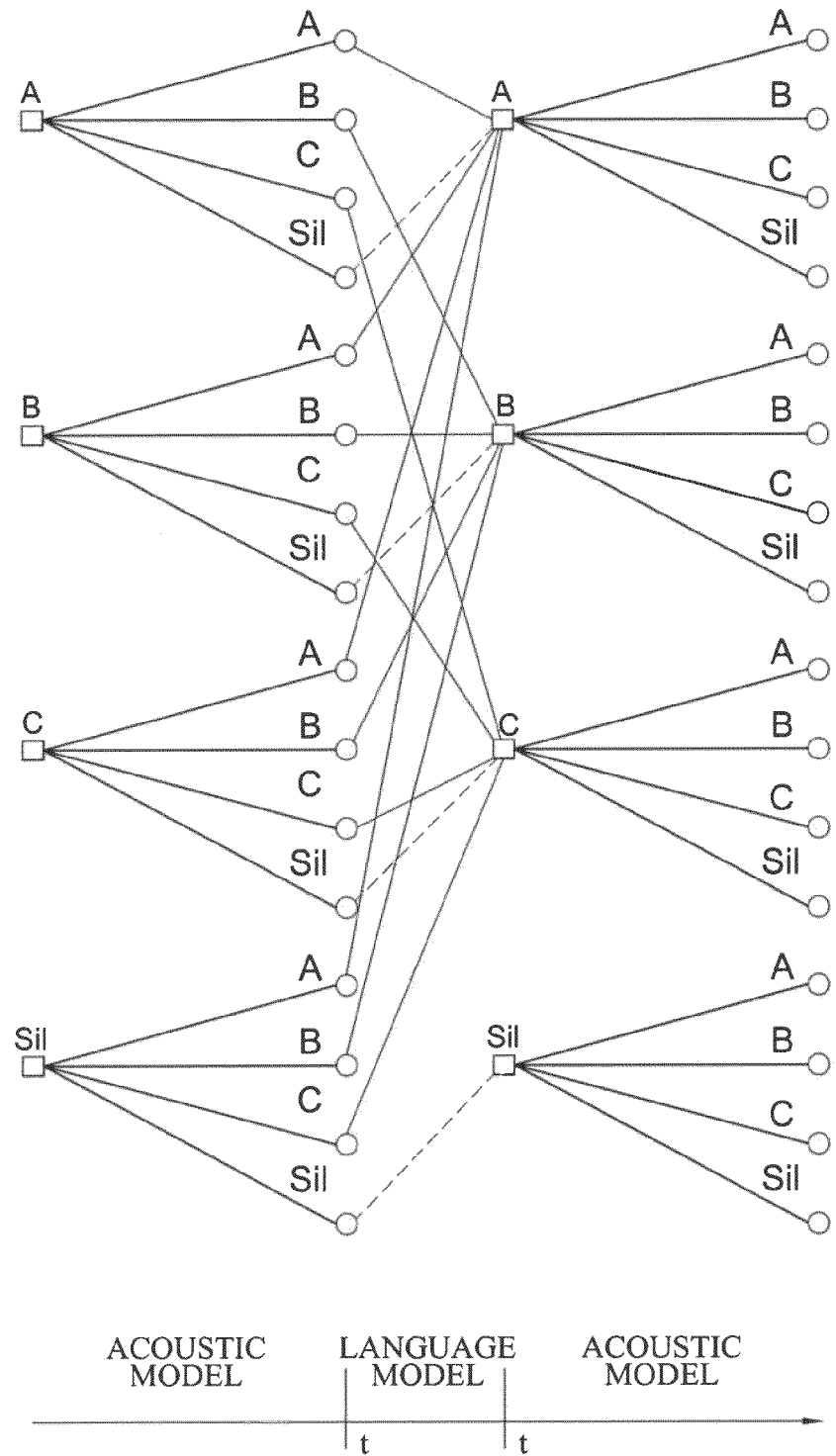
FIG. 3 is a schematic showing the search space based on a lexicon network and bigram LM.

FIG. 3 shows a schematic of the search space for ASR taken from H. Ney and S. Ortmanns, "Progress in Dynamic Programming Search for LVCSR", Proceedings of the IEEE, August 2000, pp 1224-pp 1240. In FIG. 3, the lexical network contains 3 words A,B,C and a silence. In every frame t, all the hypotheses which end as same word are recombined and propagated into a new lexicon network with corresponding word history.

Given the acoustic feature sequence, the principle of decoding can be expressed as $$\tilde{w}_1^K = \underset{w_1^K}{\operatorname{argmax}} \left\{ P(w_1^K) \cdot \underset{s_1^T}{\max} P(x_1^T, s_1^T \mid w_1^K) \right\} \quad (2)$$

where $w_1^K$ is a word sequence in search space, $x_j^T$ is the acoustic feature sequence from frame 1 to frame T, and $s_1^T$ is a HMM state sequence from frame 1 to T. In time-synchronous viterbi decoding with SLM information, for every frame t, the dynamic programming process can be divided into 2 parts, the process within a word and the process at the boundary of the word. If the bigram decoding is adopted, the process within a word can be expressed as follows $$Q_v(t, s) = \underset{s'}{\max} \{ p(x_t, s \mid s') \sqsupset Q_v(t-1, s') \} \quad (3)$$

$$B_v(t, s) = B_v(t-1, s_v^{max}(t, s))$$

where, the $Q_v(t,s)$ is the score of the best partial path that ends at time t in state s of lexical network with the predecessor v, the system uses $Q_v(t,s)$ to propagate the hypotheses. The $B_v(t,s)$ is the end time of the last history word in the best partial path that ends at time t in state s of the lexical network, with the predecessor v. the system uses $B_v(t,s)$ to store trace back information. $s_v^{max}(t,s)$ is the optimum predecessor state for the hypothesis (t,s) and the predecessor v.

At the boundary of a word, the LM score has to be added to the total score of partial path, then, all the hypotheses which end as word w at time t should be recombined, i.e.

$$H(w; t) = \underset{v}{\max} \{ P(w \mid v) \cdot Q_v(t, S_w) \} \quad (4)$$

where $S_w$ is the terminal state of word w in lexical network. After the LM score is added, the new score is used to carry out the next step dynamic programming process, i.e.

$$Q_v(t-1, s=0) = H(v; t-1)$$

$$B_v(t-1, s=0) = t-1 \quad (5)$$

The hypotheses with small scores are removed by pruning. The pruning approach includes acoustic beam pruning, language model beam pruning and histogram pruning, etc. For every frame t, the acoustic beam pruning selects the best state hypothesis, and only the hypotheses with a score close to the best score are kept, i.e.

$$Q_{AC}(t) = \underset{(v,s)}{\max} \{ Q_v(t, s) \} \quad (6)$$

the state hypothesis (t,s,v) will be pruned if $$Q_v(t,s) < f_{AC} \cdot Q_{AC}(t) \quad (7)$$

where $f_{AC}$ is the pruning threshold.

The language model pruning is only applied to the hypotheses which reach the word boundary in current frame t. It can be described as:

$$Q_{LM}(t) = \underset{(v,s)}{\max} \{ Q_v(t, s=0) \} \quad (8)$$

the hypothesis at word boundary (t,s=0,v) will be pruned if $$Q_v(t,s=0) < f_{LM} \cdot Q_{LM}(t) \quad (9)$$

As previously described, the present invention is concerned with the language model and more specifically LM look-ahead technology The decoding algorithm mentioned above is based on the lexical pronunciation network where the system can not get the word ID until the first arc that is not shared with other words is reached. Therefore, the word ID is usually located near to the tail of the lexical pronunciation network. Since the language model provides restrictions on how to concatenate words, it can only be incorporated into the decoding process very late when the word ID is detected.

However, in order to introduce the LM score as early as possible, LM look-ahead technology was presented in S. Ortmanns, H. Ney and A. Eiden, "Language-Model Look-ahead for Large Vocabulary Speech Recognition", in Proc. Int. Conf. Spoken Language Processing, Philadelphia, Pa., October 1996, pp 2095-pp 2098

Given a LM context, for every node in the LM look-ahead network, the LM look-ahead probability is defined as the maximum LM probability over all the words that can be reached from this particular node, i.e.

$$\pi(n \mid h) = \underset{w \in W(n)}{\max} P(w \mid h) \quad (10)$$

where W(n) represents the set of the words that can be reached from node n.

The basic idea of LM look-ahead is incorporating the LM look-ahead probabilities into the dynamic programming procedure to achieve more efficient pruning. Without the LM look-ahead technology, the scores of the hypotheses within a word do not contain the LM score of the current word, since the current word ID is unknown. When the LM look-ahead is used, the LM look-ahead probabilities are incorporated into the original score of the hypotheses and the pruning is carried out based on these new scores.

Figure 4:
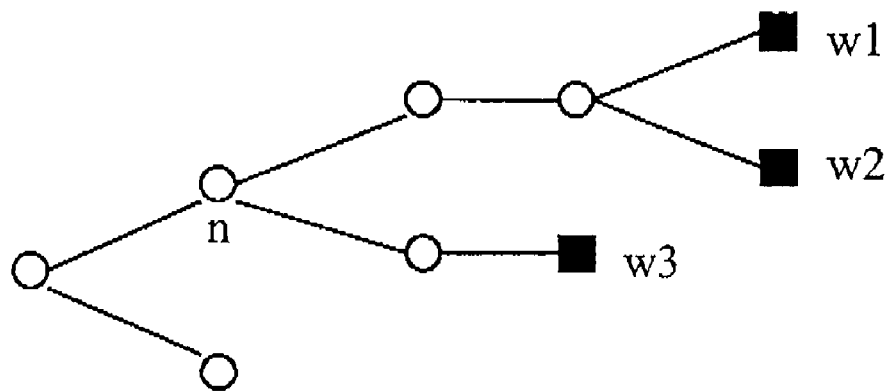
FIG. 4 is a schematic of a LM look-ahead probability tree.

FIG. 4 is a diagram of a LM look ahead probability tree. The LM look-ahead network is a copy of the pronunciation network for example of the type shown in FIG. 2. In the LM look ahead tree of FIG. 4, every node contains its LM look-ahead probability, given a particular LM context. The LM look-ahead network can be compressed by removing all the nodes that have only one successor node.

The conventional method of calculating the LM look-ahead probabilities adopts a dynamic programming procedure. Initially, the LM look-ahead probabilities of the leaf nodes in LM look-ahead network are assigned as the real LM probabilities of different words, since every leaf node in LM look-ahead network corresponds to an individual word. Then, for every particular node, the LM look-ahead probability is determined by the maximum LM look-ahead probability of its successor nodes. The LM look-ahead probabilities of the whole LM look-ahead network can be calculated recursively from bottom to top, i.e.

$$\pi(n\mid h) = \max_{n'\in s(n)} \pi(n'\mid h) \qquad (11)$$

where s(n) is the set of successor nodes of node n.

Typically, the LM look-ahead probabilities have to be generated on-line during the decoding process. Therefore, the efficiency of calculating the LM look-ahead probabilities greatly influences the decoding speed. Although the dynamic programming procedure provides an efficient way to calculate LM look-ahead probabilities it results in an excessive number of calculations.

Figure 5:
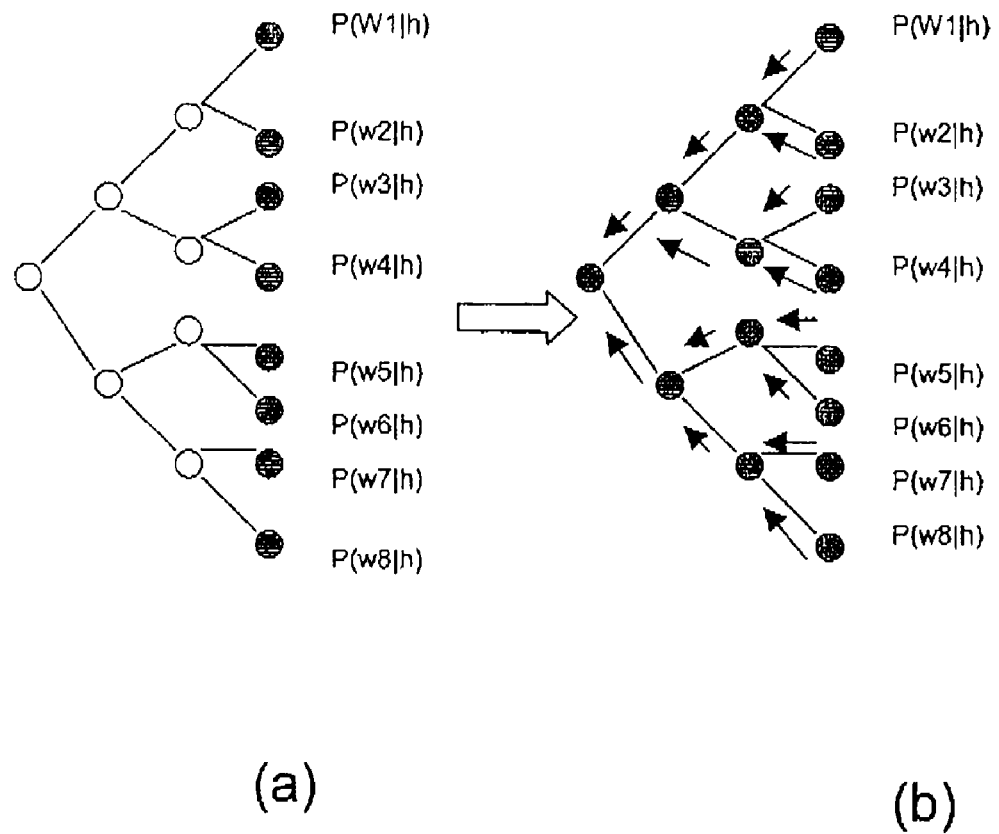
FIGS. 5a and 5b shows the steps in calculating language model look ahead probabilities in accordance with a method of the prior art.

FIG. 5 shows the calculation of LM look-ahead probabilities. The calculation is divided into 2 parts with the first part shown in FIG. 5a and the second part in FIG. 5b. The first part is to calculate the LM probabilities of every word in the vocabulary based on the LM context e.g. the n-gram model probability of the word. The second part is to assign the LM look ahead probability for each node in the LM look-ahead network by summing the LM probabilities of all of the words which can be reached from a specific node for each node.

The LM look-ahead probability is assigned through the dynamic programming procedure. Supposing that the vocabulary contains V words, the LM look-ahead network contains M nodes. This means that for each LM history occurring in the search space, the LVCSR system has to look up V probabilities in step 1 and generate M look-ahead probabilities in step 2. The values of V and M are quite big in LVCSR system. Typically during the recognition process of one sentence, there are several hundred bigram contexts and several thousand trigram contexts occurring in the search space.

For the higher order n gram, for example, a four gram, the number of LM contexts in the search space is even bigger. For every LM context, the LM probability calculation mentioned above has to be carried out. Therefore, using traditional methods to calculate the LM look-ahead probabilities, the CPU cost is high.

Meanwhile, if the LM look-ahead probabilities occurring in search space are cached, supposing that the LM look-ahead network contain M nodes, and there are N different LM contexts occurring in the search space, then in total M*N LM probabilities need to be stored. In the LVCSR system, when the high order n-gram decoding is used, both the M and the N are big, therefore the memory cost performing LM look-ahead is also high.

Figure 6:
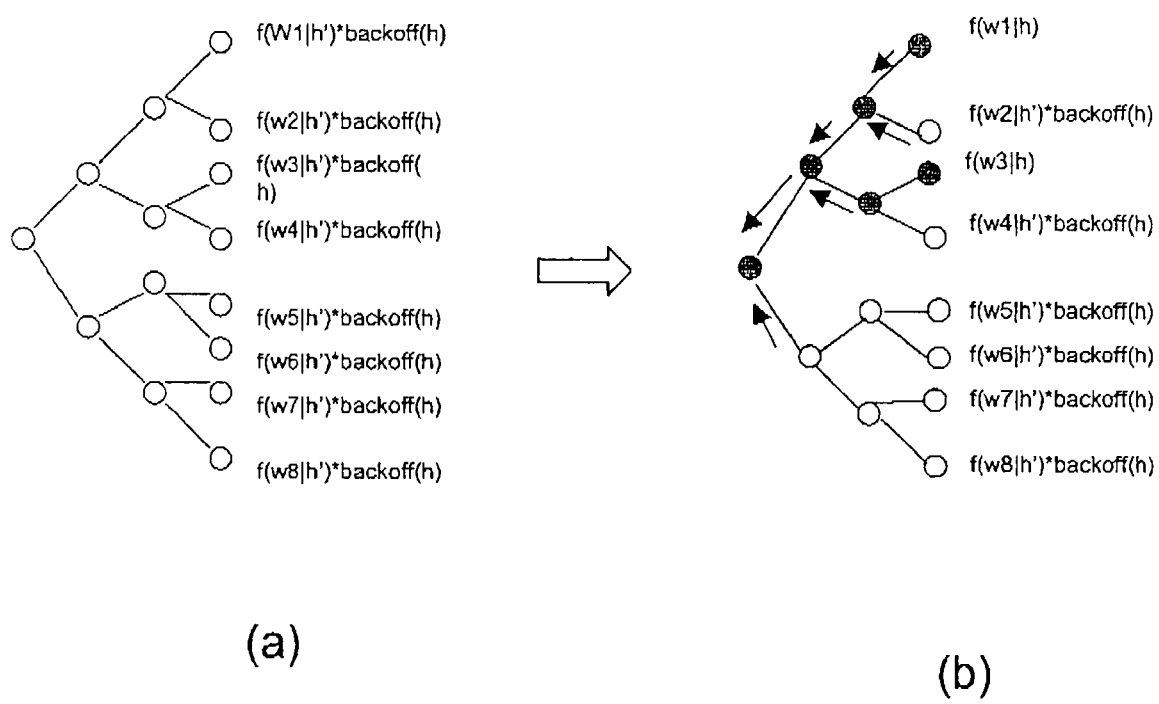
FIGS. 6a and 6b show the steps in calculating language model look ahead probabilities in accordance with an embodiment of the present invention.

FIG. 6 schematically illustrates a method for calculating LM look ahead probabilities in accordance with an embodiment of the present invention.

In the embodiment, low-order LM look-ahead information is used to reduce the calculation of the higher order LM look-ahead. The method described with reference to FIG. 5 does not make use of the low order LM look-ahead information and every node in the LM look-ahead network has to be assigned a LM look-ahead probability.

In method in accordance with an embodiment of the present invention, only the LM look-ahead probabilities in a small subset of the nodes need to be updated, while for most of the nodes in the LM look-ahead network, their LM look-ahead probability can be copied directly from the low order LM look-ahead network.

The backoff based n-gram model can be expressed as follows:

$$P(w\mid h) = \begin{cases} f(w\mid h) & \text{if}(C(h,w)>0) \\ f(w\mid h')*\text{Backoff}(h) & \text{otherwise} \end{cases} \qquad (12)$$

where f(·) is the discounted LM probability read from n-gram file, C(·) is the frequency of the event occurring in training corpus, Backoff(h) is the backoff parameters of history h which makes the sum of probabilities over all the w equal to 1, and h' represents the lower order history of h.

Eqn 12 indicates that when the history-word part can not be found in the n-gram data, the lower order model is used as the back-off estimate. Practically speaking, for a large vocabulary applications, given a history h, the number of different history-word pairs that can be found in training data is much smaller than the size of the vocabulary V. It means that for every word history h, most of the n-gram probabilities are given by the back-off estimate. This phenomenon can be used to accelerate the calculation in language modelling.

When considering n-gram language models it is necessary to collate statistical information concerning a word and the occurrences of preceding words. However, this data is not always available. To address this issue the concept of a back-off parameter was derived which allows one to estimate, for example, a bigram probability from a unigram model for a particular word when there is no bigram data for that word available. For example, in the embodiment of FIG. 6, the back-off parameters are calculated as follows:

The n-gram LM can be calculated as $$P(w\mid h) = \begin{cases} f(w\mid h) & \text{if}(C(h,w)>0) \\ f(w\mid h')*\text{Backoff}(h) & \text{otherwise} \end{cases} \qquad (a)$$

As a probability it should satisfy that $$\sum_w P(w\mid h) = 1 \qquad (b)$$

According to the Eqn a, eqn b can be rewritten as $$\sum_w P(w\mid h) = \sum_{w:C(h,w)>0} f(w\mid h) + \sum_{w:C(w,h)=0} \text{backoff}(h)*f(w\mid h') = 1 \qquad (c)$$

Thus the back off parameters can be calculated from:

$$\text{backoff}(h) = \frac{1-\sum_{w:C(h,w)>0} f(w\mid h)}{\sum_{w:C(h,w)=0} f(w\mid h')} = \frac{1-\sum_{w:C(h,w)>0} f(w\mid h)}{1-\sum_{w:C(h,w)>0} f(w\mid h')} \qquad (d)$$

The back-off parameters can be calculated in advance and stored.

The definition of the LM look-ahead in node n is the maximum LM probability over all the words that can be reached from n, which can be expressed as:

$$\pi(n \mid h) = \max_{w \in W(n)} P(w \mid h) \quad (13)$$

where W(n) represents the set of the words that can be reached from node n.

According to Eqn(12), the definition of LM look-ahead can be re-written as:

$$\pi(n \mid h) = \max\{\pi_1(n \mid h), \pi_2(n, h)\} \quad (14)$$

where $$\pi_1(n \mid h) = \max_{w \in W(n) \&\& C(w,h) > 0} f(w \mid h) \quad (15)$$

and $$\pi_2(n \mid h) = \max_{w \in W(n) \&\& C(w,h) = 0} f(w \mid h') * \text{backoff}(h) \quad (16)$$

Therefore, the nodes in the LMLA tree can be divided into 2 parts, i.e.

$$N = N_1 \cup N_2$$

$$N_1 = \{n \mid \pi(n \mid h) = \pi_1(n \mid h)\}$$

$$N_2 = \{n \mid \pi(n \mid h) = \pi_2(n \mid h)\} \quad (17)$$

Given the word history h, only the LMLA probabilities which are related to $N_1$ need to be calculated using the explicit n-gram estimates, while the rest of LMLA probabilities which are related to $N_2$ are calculated using backoff estimates.

Based on the analysis above, a new method for calculating the LMLA probability is presented According to the analysis above, the calculation of LM look-ahead can be divided into 4 steps.

Step 1: generating a low order LM look-ahead network, T, for each node n in T $$\pi(n \mid h') = \max_{w \in W(n)} P(w \mid h') \quad (17)$$

Step 2: multiplying low order LM look-ahead probabilities by the backoff parameters of history h, to generate a new LM look-ahead network (tree), $\tilde{T}$, for each node n in $\tilde{T}$ $$\tilde{\pi}(n \mid h) = \text{Backoff}(h) * \max_{w \in W(n)} P(w \mid h') \quad (18)$$

Step 3: for each word w that co-occurred with the LM context h in the training corpus, replace the backoff LM probability in the leaf nodes of $\tilde{T}$ with the discounted LM probabilities in n-gram model, i.e. if C(h,w)>0, using f(w|h) to replace f(w|h')*backoff(h) in $\tilde{T}$.

Step 4: for each word w in W={w|C(h,w)>0}, update the LM look-ahead probabilities in the node from which the w can reached, using the dynamic programming procedure.

FIG. 6 shows the calculation of LMLA probabilities based on the new method. FIG. 6a shows steps 1 and 2 and FIG. 6b shows steps 3 and 4. The new method to calculate the LMLA probabilities starts from a backoff LMLA tree. The LMLA tree in FIG. 6 contains 8 leaves, i.e. 8 individual words. Given the LM context h, supposing that only 2 words: $w_1$ and $w_3$, have explicit LM probabilities, the new method only needs to calculate the LMLA probabilities in the nodes from which the $w_1$ and $w_3$, can be reached, i.e. the black nodes in FIG. 6, while the rest LMLA probabilities, i.e. the LMLA probabilities in the grey nodes, can be copied from the backoff LMLA tree directly.

The method of the embodiment reduces the CPU cost significantly by calculating only a subset of nodes in the LM look-ahead tree, i.e. the nodes belong to $N_1$ in Eqn 17, instead of updating every node like the old method. For a particular LM context h, the word set W={w|C(h,w)>0} is much smaller than the whole recognition vocabulary. Therefore the nodes in $N_1$ are only a small subset of nodes in LM look-ahead tree.

Thus, the high order LM look-ahead probabilities, e.g., trigram look-ahead probabilities, can be calculated very efficiently. Traditional method keeps one buffer to cache the LM look-ahead networks which occurred in search space, so that these LM look-ahead networks can be re-used in future. In the proposed method, in order to calculate the n gram LM look-ahead probabilities, not only n gram look-ahead networks but also n−1 gram look-ahead networks need to be cached. Before the n gram look-ahead probability is calculated, a check is made to see if the required n gram look-ahead network is already cached in n gram look-ahead buffer. If not, the corresponding n−1 gram look-ahead network will be searched in n−1 gram look-ahead buffer. Then, the n gram look-ahead network will be generated from the n−1 gram look-ahead network using the proposed method. Similar operation is carried out when the n−1 gram look-ahead network is calculated, i.e. the n−2 gram look-ahead networks need to be cached to generate the n−1 gram look-ahead networks. This operation is carried out iteratively, the lower order look-ahead networks are always cached to generate the higher order look-ahead networks.

Using the method of the embodiment, the CPU cost of calculating the LM look-ahead probabilities can be reduced significantly.

In the traditional method, for every node in the LM look-ahead tree, the corresponding LM look-ahead probability needs to be calculated.

In the proposed method, there are only a subset of nodes in LM look-ahead tree, whose LM look-ahead probability need to be updated. Defining Node(w) as the set of nodes from which the word w can be reached. Then, all the nodes in the LM look-ahead network whose LM look-ahead probability need to be updated can be expressed as:

$$N = \bigcup_{w:C(h,w)>0} \text{Node}(w) \quad (19)$$

For a particular LM context h, the word set W={w|C(h,w)>0} is much smaller than the whole recognition vocabulary. Therefore the number of nodes in set N is much less than the total number of nodes in LM look-ahead network.

The method of the embodiment can also reduce the memory cost. At the first glance, the proposed method needs to cache both the higher order and lower order look-ahead networks so the memory cost is high. However, the size of buffer to cache the lower order look-ahead networks is much smaller than those to cache the higher order look-ahead networks. On the other hand, the proposed method is much faster than the traditional method, therefore, only the most frequent look-ahead networks need to be cached, the remaining less frequent look-ahead networks can be generated on demand without too great CPU cost. Since the most frequent look-ahead networks only take a small part of memory compared to all the look-ahead networks occurring in the search space, the proposed method actually reduces the memory cost.

Furthermore, traditional method caches all the LM look-ahead networks in search space. In the proposed method, for every n gram context, the system can check if n gram probabilities based on this context really exist in the model. If there is not n gram probability stored for a particular n gram context, the n gram look-ahead network related to this context need not to be stored, the n−1 gram look-ahead network will be used directly. Therefore, in methods according to embodiments of the invention, the n gram look-ahead network being stored can be reduced further.

1. The method of the embodiment accelerates the calculation of LM look-ahead probabilities significantly.
2. The method of the embodiment can reduce the memory cost of trigram or higher order n-gram look-ahead.

The method of the embodiment the calculation of higher order LMLA probability depends on the value of the lower order LMLA probabilities, a multi-cache structure is designed to implement the high order LMLA. The number of the caches kept by the system is same as the order of LM adopted by decoder. There is a cache for the LMLA probabilities of each order. If a requested LMLA tree does not exist in the cache, it is generated using the corresponding backoff tree from low order LMLA cache.

Figure 7:
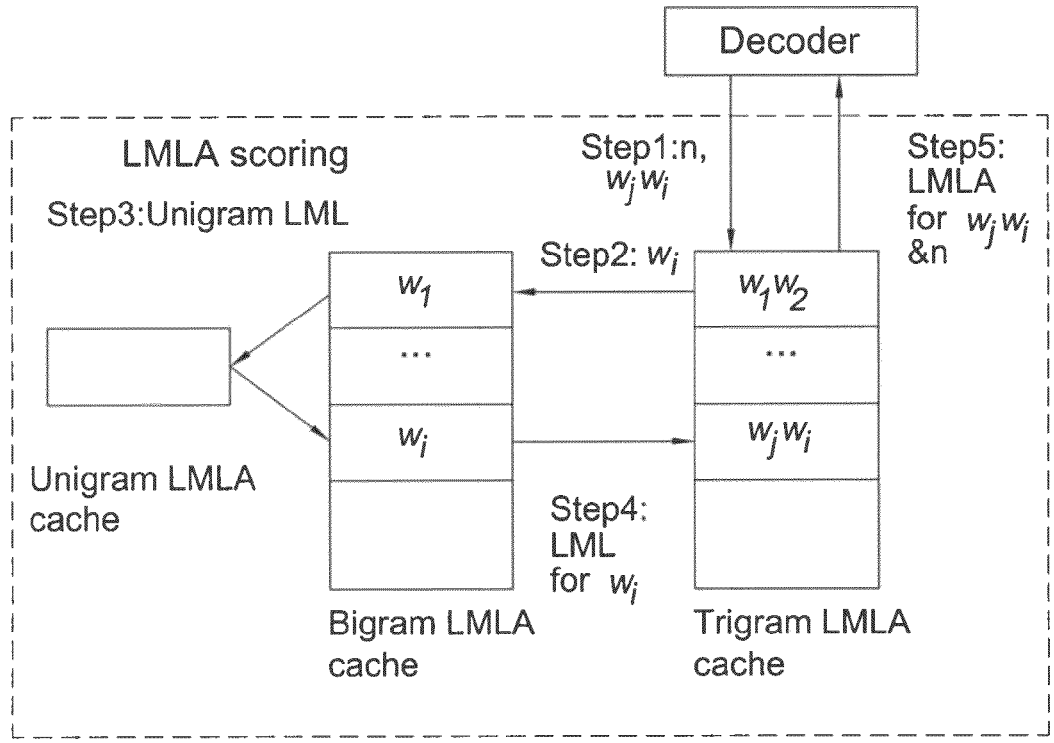
FIG. 7 shows a trigram LMLA based on a multi-cache structure.

FIG. 7 shows the framework of trigram LMLA based on the multi-cache. Based on multi-cache structure, trigram LMLA can be divided into 5 steps:

Step 1: the decoder requests for the LMLA score for node n and word history $w_j w_i$ from LMLA scoring module, LMLA scoring module check if the requested LMLA probability is already in the trigram LMLA cache, if it is, then the LMLA probability is returned, otherwise, go to step 2.
Step 2: the bigram word history $w_i$ is used to look-up the bigram LMLA cache, if the LMLA buffer for $w_i$ is already in the cache, go to step 4, otherwise go to step 3.
Step 3: using the unigram LMLA buffer, the bigram LMLA buffer for $w_i$ is generated and cached.
Step 4: using the bigram LMLA buffer for $w_i$, the trigram LMLA buffer for $w_j w_i$ is generated and cached.
Step 5: the requested LMLA probability is return to decoder.

The method of FIG. 6 was used with a trigram LMLA having a WSJ 20k vocabulary system. The training speech is WSJ0 and WSJ1 corpus, SI284 training set. The vocabulary is a closed vocabulary with about 20k words provided by Linguistic Data Consortium (LDC). The acoustic model contains 6000 tied HMM states with 10 Gaussian mixture components per state. The speech feature vector is 33 dimensions, including 10 C-MFCKL, 1 LOG energy, and their first-order and second-order time derivatives. The LM is a trigram language model trained by WSJ87-89 text corpus with about 40M words.

TABLE 1

The CPU cost comparison for LMLA between traditional method and the new method.

| Configuration of LMLA | MIPS | CPU cost for LMLA |
|---|---|---|
| Traditional bigram LMLA | 6054 | 25.8% |
| Bigram LMLA with new method | 5328 | 7.5% |
| Traditional trigram LMLA | 9589 | 65.8% |
| Trigram LMLA with new method | 5280 | 10.0% |

Table 1 shows the CPU cost of LMLA with different configuration based on the same beam width. It can be seen that the method proposed in this paper greatly reduced the calculation cost of LMLA probabilities. The processing of generating the bigram LMLA tree is accelerated by a factor of 3 and the process of generating the trigram LMLA tree is accelerated by a factor of 12. When the trigram LMLA is used, the number of different trigram contexts occur in the search space is much more than the number of bigram context. In the old method, the benefit of trigram LMLA can not compensate the extra calculation brought by LMLA and the system is even slower than the bigram LMLA system. On the other hand, because the new method calculates the LMLA probability much faster than traditional method, trigram LMLA speed-up the system further compared to the bigram LMLA, when the new method is used.

Table 2 shows the performance of the trigram LMLA and the bigram LMLA based on the new method. To achieve the same WER, the decoding based on trigram LMLA is always faster than the decoding with bigram LMLA. Trigram is more efficient in fast decoding, when the Beam width is 160, the WER of trigram LMLA is 1% better than bigram LMLA, when the beam width increased to 200, the difference reduces to 0.3%. As mentioned in section 4, the trigram LMLA in the new method is based on a multi-cache structure in which the trigram LMLA probabilities is generated from bigram LMLA probabilities and the bigram LMLA probabilities is generated from unigram LMLA probabilities. Table 3 shows the calculation quantities of different order of LMLA based on one of test utterance in WSJ 20k task. It can be seen that even there are three times more trigram LMLA trees generated, it only occupies 1.26% CUP cost, while the bigram LMLA occupies 7.63% CUP cost. This is mainly due to the sparseness of the trigram data. Because the trigram data is very sparse compared to bigram data, the nodes to be updated in trigram LMLA are much less than those in bigram LMLA. Therefore, most of the calculation cost is from bigram LMLA even it is called less frequently.

TABLE 2

The comparison results of trigram LMLA and bigram LMLA based on new method

| Beam width | Bigram LMLA | | Trigram LMLA | |
|---|---|---|---|---|
| | MIPS | WER | MIPS | WER |
| 160 | 2490 | 13.9% | 2476 | 12.9% |
| 170 | 2975 | 11.4% | 2959 | 11.0% |
| 180 | 3604 | 10.2% | 3572 | 9.9% |
| 190 | 4378 | 9.5% | 4329 | 9.0% |
| 200 | 5328 | 9.2% | 5280 | 8.9% |

TABLE 3

| | calculation quantity of different orders of LMLA based on new method | |
|---|---|---|
| | # of LMLA trees be generated | The CPU cost for LMLA |
| Bigram LMLA | 322 | 7.63% |
| Trigram LMLA | 1247 | 1.26% |

Figure 8:
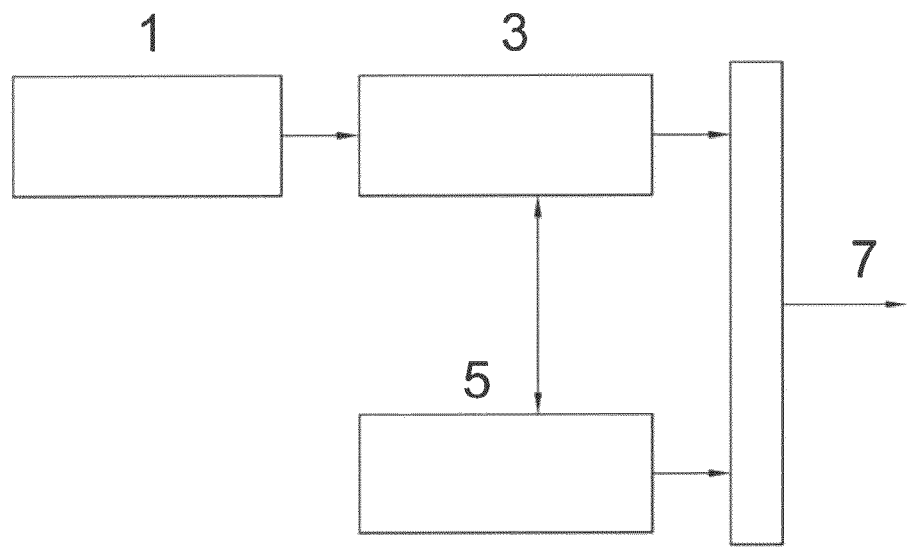
FIG. 8 is a schematic of a general system for signal processing using LMLA.

As previously noted, the present invention may also be applied to a range of systems where dynamic processing of an input signal in conjunction with a language model is required. FIG. 8 shows a basic system where the input signal is provided in input unit 1. The output from unit 1 is then supplied to unit 3 where an acoustic model or other model which can generate a first probability distribution of the likely words in the input signal determined. For example, in speech recognition this unit would provide the acoustic phonetic model. Unit 5 provides the language model which incorporates restrictions on how the words can be concatenated in the language. There can be communication between the language model and the acoustic model unit 3. Finally the decoder 7 generates the output, which in the case of speech recognition will be words.

The system can be part of a speech to speech translation system where the output is further translated and outputted as speech using a TTS system or the like.

Also, the system can be used for OCR, where instead of speech the input at input unit 1 will be scanned text and instead of providing an acoustic model, unit 3 will output a probability of words located in the scanned text. The language model 5 will operated in the same manner as described before. The decoder 7 will output text which can be read and maniupulated by a computer for use in word processing or the like. Similarly the system can be applied to handwriting analysis where the input is handwritten text and the unit 3 decodes handwritten text. Again the language model operates in the same fashion as described above.

Finally, the system may also be used for non-conventional language models for examples in DNA genome sequencing.

The invention claimed is:

1. A system for calculating the look ahead probabilities at the nodes in a language model look ahead tree, wherein the words of the vocabulary of the language are located at the leaves of the tree,
said system comprising a processor adapted to:
to obtain a first low order language model look ahead tree having a language first low order language model probability assigned to the words of the vocabulary and the language model look ahead probabilities calculated for nodes in said first low order language model look ahead tree;
to determine if the language model probability of one or more words of said vocabulary can be calculated using a higher order language model and updating said words with the higher order language model; and
to update the look ahead probability at the nodes of the first low order language model look ahead tree which are affected by the words where the language model has been updated, wherein the first low order language model look ahead tree is one order lower than the higher order language model.

2. A system according to claim 1, wherein said processor which is adapted to assign a language model probability using the lower order language model is configured to use a back-off parameter.

3. A system according to claim 1, wherein said processor which is adapted to determine if the language model probability of one or more words of said vocabulary can be calculated using a higher order language model is configured to determine if a word has occurred in combination with a previously recognised word.

4. A system according to claim 1, wherein the higher order model is a bigram, trigram, fourgram or higher order n-gram model.

5. A system according to claim 4, further comprising a memory having a multi-cache structure, wherein the number of caches of the memory equals the order of the n-gram model used in the system.

6. An automatic speech recognition system comprising:
a receiver adapted to receive speech;
a processor adapted to,
extract acoustic signals from said speech and determine a first probability of the words contained in said speech,
provide a language model to determine a second probability of the words contained in said speech, comprising a system for calculating the look ahead probabilities at the nodes in a language model look ahead tree in accordance with claim 1, and
to combine the first and second probabilities and output the words recognised from the received speech.

7. A speech to speech translation system comprising the automatic speech recognition system of claim 6 and a processor adapted to translate the outputted words into a further language.

8. An OCR system comprising:
a receiver adapted to receive scanned text; and
a processor adapted to,
determine a first probability of the words contained in said text,
provide a language model to determine a second probability of the words contained in said text, comprising a system for calculating the look ahead probabilities at the nodes in a language model look ahead tree in accordance with claim 1, and
combine the first and second probabilities and output the words recognised from the scanned text in a format which can be read by a computer.

9. A handwriting recognition system comprising:
a receiver adapted to receive handwritten text; and
a processor adapted to,
determine a first probability of the words contained in said text,
provide a language model to determine a second probability of the words contained in said text, comprising a system for calculating the look ahead probabilities at the nodes in a language model look ahead tree in accordance with claim 1, and
combine the first and second probabilities and output the words recognised from the handwritten text.

10. A system according to claim 1, wherein said processor is adapted to update one or more words with a higher order language model probability a plurality of times in an iterative manner and increase the order of language model look ahead tree by 1 for each iteration.

11. A system according to claim 1, wherein the lower order language model look ahead tree is a language model look ahead tree which has been previously updated, the order of said updated lower order language model look ahead tree being the order of the highest order language model used to update the updated lower order-language model look ahead tree.

12. An automatic speech recognition system according to claim 11, further comprising a cache and wherein said processor is adapted to retrieve said previously updated lower order language model look ahead tree from said cache.

13. A system according to claim 1, wherein the first low order language model look ahead tree is an n−1 gram language model look ahead tree and said higher order language model is an n-gram language model, and n is an integer of at least 2.

14. A system according to claim 10, wherein in the first iteration the language model look ahead probabilities are updated using a bigram language model and then in the second iteration, the updated model is further updated using a trigram language model probabilities.

15. A system according to claim 1, wherein said processor is adapted to cache said lower order language model look ahead tree.

16. A method of calculating language model look ahead probabilities at the nodes in a language model look ahead tree, wherein the words of the vocabulary of the language are located at the leaves of the tree,
said method comprising:
assigning a language model probability to each of the words of the vocabulary using a first low order language model;
calculating the language look ahead probabilities for all nodes in said tree using said first language model;
determining if the language model probability of one or more words of said vocabulary can be calculated using a higher order language model and updating said words with the higher order language model probabilities; and
updating the look ahead probability at only the nodes which are affected by the words where the language model has been updated.

17. A method according to claim 16, wherein determining the lower order language model probabilities uses a back-off parameter.

18. A method according to claim 16, wherein determining if the language model probability of one or more words of said vocabulary can be calculated using a higher order language model determines if a word has occurred in combination with a previously recognised word.

19. A method according to claim 16, wherein the higher order model is a bigram, trigram, fourgram or higher order n-gram model.

20. A method according to claim 16, further comprising:
decoding a subsequent signal by resetting the language model look ahead probabilities to the lower order language model;
determining if the language model probability of one or more words of said vocabulary can be calculated using a higher order language model and updating said words with the higher order language model probabilities; and
updating the look ahead probability at only the nodes which are affected by the words where the language model has been updated.

21. An automatic speech recognition method comprising:
receiving speech;
extracting acoustic signals from said speech and determining a probability of the words contained in said speech based on said acoustic signals;
providing a language model, comprising calculating the look ahead probabilities at the nodes in a language model look ahead tree in accordance with claim 16; and
outputting the words recognised from the received speech.

22. A speech to speech translation method comprising the automatic speech recognition method of claim 21 and translating of the outputted words into a further language.

23. An OCR method comprising:
receiving scanned text;
determining a first probability of the words contained in said text;
providing a language model to determine a second probability of the words contained in said text, comprising a method for calculating the look ahead probabilities at the nodes in a language model look ahead tree in accordance with claim 16; and
combining the first and second probabilities and output the words recognised from the scanned text in a format which can be read by a computer.

24. A handwriting recognition method comprising:
receiving handwritten text;
determining a first probability of the words contained in said text;
providing a language model to determine a second probability of the words contained in said text, comprising a method for calculating the look ahead probabilities at the nodes in a language model look ahead tree in accordance with claim 16; and
combining the first and second probabilities and output the words recognised from the handwritten text.

25. A non-transitory computer readable medium storing program instructions for controlling a computer to carry out the method of claim 16.

* * * * *